United States Patent
Shi et al.

(10) Patent No.: US 9,283,676 B2
(45) Date of Patent: Mar. 15, 2016

(54) REAL-TIME ROBOTIC GRASP PLANNING

(71) Applicant: GM GLOBAL TECHNOLOGY OPERATIONS LLC, Detroit, MI (US)

(72) Inventors: Jianying Shi, Oakland Township, MI (US); Gurdayal Singh Koonjul, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 90 days.

(21) Appl. No.: 14/310,567

(22) Filed: Jun. 20, 2014

(65) Prior Publication Data

US 2015/0367514 A1    Dec. 24, 2015

(51) Int. Cl.
*G05B 19/04* (2006.01)
*G05B 19/18* (2006.01)
*B25J 9/16* (2006.01)

(52) U.S. Cl.
CPC .............. *B25J 9/1669* (2013.01); *B25J 9/1612* (2013.01); *B25J 9/1687* (2013.01); *G05B 2219/39509* (2013.01); *G05B 2219/39536* (2013.01); *G05B 2219/40032* (2013.01)

(58) Field of Classification Search
CPC ...... B25J 9/1669; B25J 9/1687; B25J 9/1612; G05B 2219/40032; G05B 2219/39509; G05B 2219/39536
See application file for complete search history.

(56) References Cited

U.S. PATENT DOCUMENTS

| 2006/0012198 A1* | 1/2006 | Hager | B25J 15/0009 294/106 |
| 2009/0302626 A1* | 12/2009 | Dollar | B25J 9/104 294/106 |

* cited by examiner

*Primary Examiner* — Mary Cheung
(74) *Attorney, Agent, or Firm* — Quinn Law Group, PLLC

(57) ABSTRACT

A method of determining an optimal grasp pose of an object by an end-effector of a robot in the execution of a task includes receiving a set of inputs via a controller, including a descriptive parameter of the object, a task wrench having a frame of reference, and a commanded end-effector grasp force. The method includes calculating a grasp wrench in the frame of reference of the task wrench, rotating and shifting the grasp pose, and then computing a resultant new grasp wrench via the controller until the task wrench and the grasp wrench are optimally balanced. Additionally, the method includes recording the optimal grasp pose as the grasp pose at which the grasp and task wrenches are optimally balanced, and then executing a control action via the controller using the recorded optimal grasp pose. A robotic system includes the robot and a controller programmed to execute the method.

13 Claims, 3 Drawing Sheets

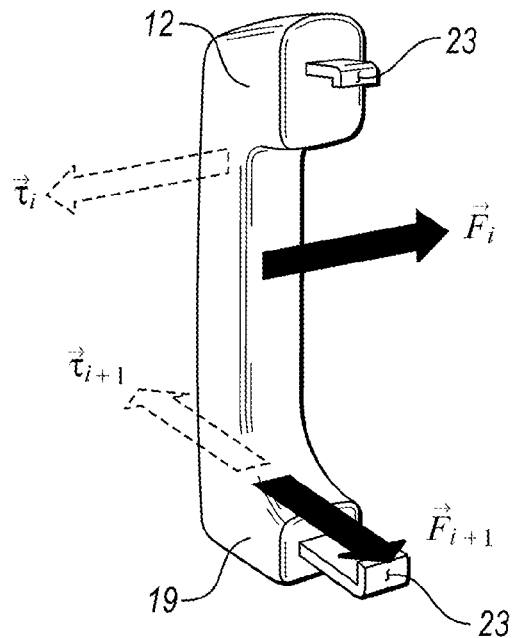
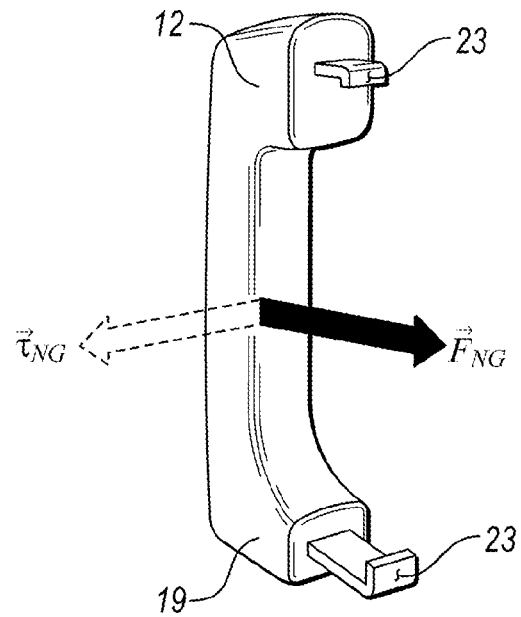
FIG. 3A    FIG. 3B
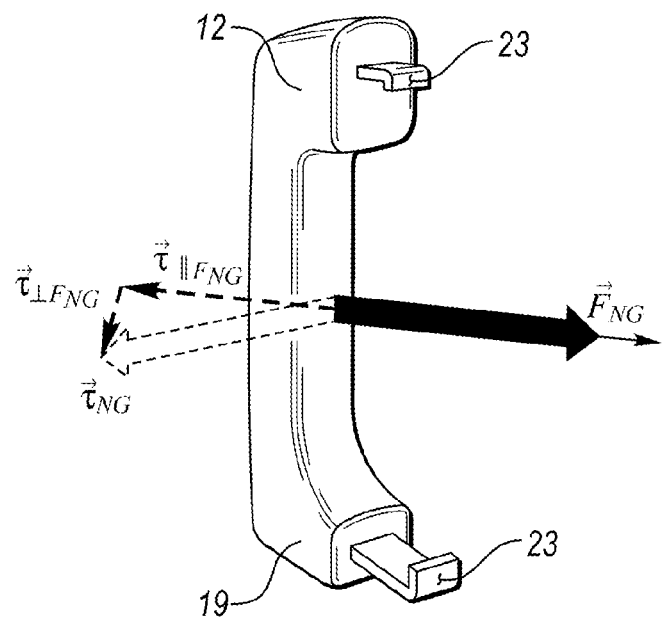
FIG. 4

REAL-TIME ROBOTIC GRASP PLANNING

TECHNICAL FIELD

The present disclosure relates to real-time robotic grasp planning.

BACKGROUND

Robotic end-effectors act directly on an object in the performance of a work task. Example end-effectors include robotic grippers or hands. Such end-effector may be used, by way of example, to grasp and manipulate an object in a given task space. The design complexity of a typical end-effector may be relatively simple, such as in the case of a two-fingered parallel gripper, or highly advanced such as with a five-fingered dexterous anthropomorphic robotic hand. In between these extremes of complexity lie other gripper designs such as three-fingered or four-fingered hands, as well as a host of other end-effector designs.

Tasks associated with robotic grippers vary with the gripper design, the geometrical complexity of the object being grasped, and the presence of obstacles or other environmental constraints. Grasp planning for a given grasp pose conventionally involves extensive programming of a controller with predefined end-effector path trajectories. Within these predefined trajectories, end-effector position and velocity may be continuously measured and controlled in a closed-loop as the end-effector moves toward a specified goal position. Alternatively, in a process referred to as demonstrated teaching, a human operator may manually backdrive and/or automatically command a demonstrated movement and grasp pose to the robot by physically moving the end-effector through a predetermined movement.

SUMMARY

A system and method are disclosed herein that collectively provide an alternative approach to the types of robotic grasp planning noted above. The system includes a robot having an end-effector that is configured to grasp a three-dimensional object. The system also includes a controller which automatically plans and selects an optimal grasp pose of the end-effector for grasping the object for a given task. The controller uses the object's known dimensions and shape as part of a set of control inputs. The control inputs are processed via the controller to determine the optimal robotic grasp pose, both in terms of grasp position and grasp orientation.

Specifically, and central to the present approach, the optimal grasp pose as determined herein is the particular grasp pose that best balances the task wrench in a static equilibrium. The term "wrench" as used in the present control context refers to the concatenation of the force and torque, a concept that is well known in statics. As is also well known in the art, multiple force and torque systems can be reduced mathematically to an equivalent single force and torque system such that the resultant torque is parallel to the resultant force per Poinsot's theorem. Execution of the present method has the intended result of automatically placing and aligning the end-effector so as to optimally balance the grasp and task wrenches, i.e., the wrench acting on the object due to execution of the grasp itself (grasp wrench) and the wrench acting on the object due to the task to be performed (task wrench). An example used herein is the grasping of a door handle in an example three-fingered grasp, followed by movement of the grasped door handle to a door panel for installation.

In a particular embodiment, a method determines an optimal grasp pose of an object by an end-effector of a robot in the execution of a task. The method includes receiving a set of inputs via a controller, including a descriptive parameter of the object, a task wrench having a frame of reference, and a commanded end-effector grasp force. The method also includes calculating a grasp wrench in the frame of reference of the task wrench, and then rotating and shifting the grasp pose via the controller until the task wrench and the grasp wrench are optimally balanced, i.e., when the sum of the task and grasp wrenches is minimized as explained herein. Additionally, the controller records the optimal grasp pose in memory as the grasp pose at which the grasp wrench and the task wrench are balanced, and then executes a control action via the controller using the optimal grasp pose.

The method may include selecting an initial grasp pose for the end-effector to the object as an arbitrary approach grasp pose that grasps the object by a set of grasp contacts, and computing the resultant grasp wrench of the initial grasp pose.

The end-effector may include a palm and multiple fingers, and the end-effector's grasp pose is composed of two parts: the palm position and orientation, and all finger joint positions. Computing the grasp pose may include computing a position and orientation of the palm and/or the finger joint positions with secure grasp contacts of each of the fingers, e.g., using known kinematics of the end-effector and the object's known dimensions and position. Computing the grasp pose may include computing an approach vector, direction or trajectory from the end effector to the object and using this approach vector, direction or trajectory to compute a position and orientation of the palm and/or the finger joint positions with secure grasp contacts on the object. Computing the grasp pose may include any relevant environmental constraints such as planar restrictions that restrict certain positions or orientations of the palm or finger joint positions.

Rotating and shifting the grasp pose of the end-effector may include rotating and shifting the palm position and orientation of the end-effector only, and then computing all finger joint positions for the grasp contacts. Rotating and shifting the grasp pose may be based on orthogonal decomposed torque components that are perpendicular and parallel to the force.

A robotic system includes a robot having an end-effector, and a controller having a processor and tangible, non-transitory memory on which is recorded instructions for determining an optimal grasp pose of an object by the end-effector in the execution of a task. Execution of the instructions by the processor causes the controller to receive a set of inputs via a controller, including a descriptive parameter of the object, a task wrench having a frame of reference, and a commanded end-effector grasping force. The controller also calculates a grasp wrench in the frame of reference of the task wrench, and rotates and shifts the grasp pose until the task wrench and the grasp wrench are optimally balanced. The controller records the optimal grasp pose in the memory as the grasp pose at which the grasp wrench and the task wrench are optimally balanced, and executes a control action via the controller using the recorded optimal grasp pose.

The above features and advantages and other features and advantages are readily apparent from the following detailed description and the accompanying drawings.

BRIEF DESCRIPTION OF THE DRAWINGS

FIG. 3A schematically depicts the grasp forces and torques applied to an example object in the form of a door handle.

FIG. 3B schematically depicts the net grasp force and torque acting on the object shown in FIG. 3A.

FIG. 4 shows orthogonal decomposition of the net grasp force and torque of FIG. 3B.

DETAILED DESCRIPTION

Figure 1:
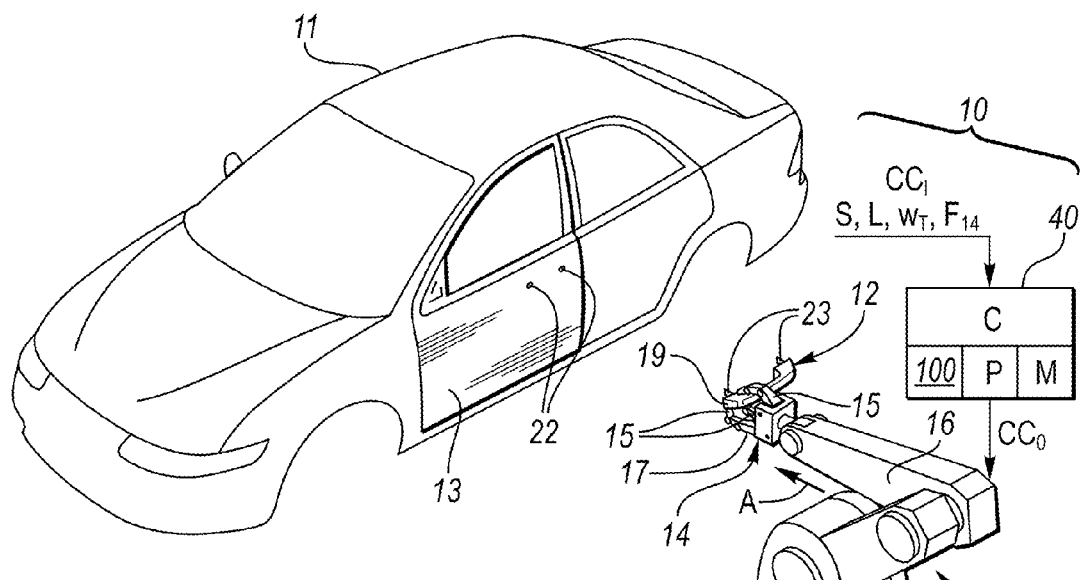
FIG. 1 is a schematic illustration of an example system having a robot with an end-effector and a controller operable to plan an optimal grasp of an object by the end-effector.

With reference to the drawings, wherein like reference numbers refer to the same or similar components throughout the several views, a robotic system 10 is shown schematically in FIG. 1. The robotic system 10 includes a robot 20 and a controller (C) 40. The robot 20 is shown as an example multi-axis assembly manufacturing or assembly robot having an end-effector 14 disposed at a distal end of a robot arm 16. The end-effector 16 may be a robotic hand or gripper having a plurality of fingers 15 collectively operable for executing a host of grasp poses, such as a pinching grasp, a full-handed power grasp using a palm 17, and the like. Grasp planning for the end-effector 14 and the robot arm 16 is performed automatically via the controller 40 by way of execution of instructions embodying a method 100, an example of which is described below with reference to FIG. 2. FIGS. 3A-6B which further explain the various steps of the method 100 are described in conjunction with FIG. 2.

Underlying the present control approach is the recognition that, for a specific object 12 such as an example door handle as shown, there may be multiple valid grasp poses for the end-effector 14. Any one of the valid grasp poses may be used to securely hold the object 12. However, the intended task to be completed may vary. An example task could be grasping and picking up the object 12 using the end-effector 14, followed by moving the object 12 to another location. A different task could using one end 19 of the object 12 to push against a surface of a door panel 13 of a vehicle body 11, and/or insertion of tabs 23 of the object 12 into mating slots 22 defined by the panel 13 in keeping with the non-limiting example door handle of FIG. 1.

Without prior knowledge by the controller 40 of the particular task to be performed, however, any one of the many valid grasp poses could be selected to simply grasp and hold the object 12. For instance, the object 12 in the example door handle shown in the various Figures could be grasped in its middle, or its end 19, or in a different location, with any number of possible grasp orientations. The controller 40 and method 100 are therefore programmed or otherwise configured to solve this particular control challenge so as to automatically compute and decide in real time which of the many possible grasp poses is optimal relative to the others, i.e., for the specific task at hand. The controller 40 makes this determination using the wrench balancing approach noted generally above, which is set forth in greater detail below with reference to FIGS. 3A-6B.

To execute the method 100, the controller 40 of FIG. 1 receives a set of control inputs $(CC_I)$, and armed with foreknowledge of the design and kinematics of the robot 20, calculates the grasp pose and thus the grasp wrench. In a possible embodiment, the control inputs $(CC_I)$ may include a descriptive parameter of the object 12, such as shape (S) and location (L), as well as a known or given task wrench $(w_T)$ and a commanded end-effector grasp force $(F_{14})$. The controller 40 calculates the optimal grasp pose as the particular pose that most closely balances the known or given task wrench with the grasp wrench.

Once this decision is made, the controller 40 next provides a set of control outputs $(CC_O)$ to the robot 20, with the control outputs $(CC_O)$ commanding execution of the optimal grasp pose. Precise motion control of the robot 20, including control over the fine and gross movements needed for grasping and manipulating the object 12 via the end-effector 14, may also be performed via the controller 40, or by another control system depending on the desired embodiment. Regardless of the design of the controller 40, within the overall control architecture each joint of the robot 20 and other integrated system components may be controlled as needed to fully coordinate the movements of the end-effector 14 in performing a work task.

The controller 40 of FIG. 1 may include multiple digital computers or data processing devices each having one or more processors (P) and memory (M), including sufficient amounts of tangible, non-transitory memory such as optical or magnetic read only memory (ROM), as well as random access memory (RAM), erasable electrically-programmable read only memory (EEPROM), and the like. The controller 40 may also include a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 40 or readily accessible thereby may be stored in memory (M) and automatically executed via the processor (P) at one or more different control levels to provide the respective control functionality.

For illustrative simplicity and consistency, the object 12 is treated hereinafter as a rigid three-dimensional component, such as the non-limiting example door handle of FIG. 1 used in the following description. Non-rigid or flexible objects may also be used. However, programming complexity for flexible parts would increase, perhaps substantially, as the shape of the object 12 in such an instance would likely change depending on the orientation of the executed grasp pose. For example, a flexible cylinder when grasped and suspended at its axial midpoint, would appear as an inverted U. When held at its end, the shape that would remain a cylinder. Thus, the shape of a flexible part could change with the location and orientation of the grasp pose. In a rigid part, such shape variation would obviously not occur. Therefore, application of the present method 100 to non-rigid parts, while possible, may require extensive modeling of the many possible ways in which the shape of the object and the associated grasp forces and torques can change.

Still referring to FIG. 1, a goal of the present method 100 is to determine where the end-effector 14 should hold the object 12 so as to best counter the known or given task wrench with a net grasp wrench, i.e., the net linear force and rotational coupling force or torque imparted by the grasp pose. The controller 40 plans the grasp approach direction (arrow A) such that, ideally, the net grasp wrench balances the task wrench, i.e.,:

$$w_T = w_G$$

where $w_G$ and $w_T$ are the net grasp wrench and task wrench, respectively. The known or given task wrench $w_T$ in a typical Cartesian frame of reference of the object 12 may be expressed as a six-dimensional vector, wherein:

$$w_T = \begin{bmatrix} f_t \\ \tau_t \end{bmatrix}, f_t = \begin{bmatrix} f_X^t \\ f_Y^t \\ f_Z^t \end{bmatrix}, \tau_t = \vec{p}_t \times \vec{f}_t = \begin{bmatrix} 0 & -z_t & y_t \\ z_t & 0 & -x_t \\ -y_t & x_t & 0 \end{bmatrix} \vec{f}_t$$

with $\vec{f}_t$ and $\tau_t$ being the respective linear force and torque exerted on the object 12 during execution of the task, and $\vec{p}_t$ is the position vector where force is applied on the object 12.

Figure 2:
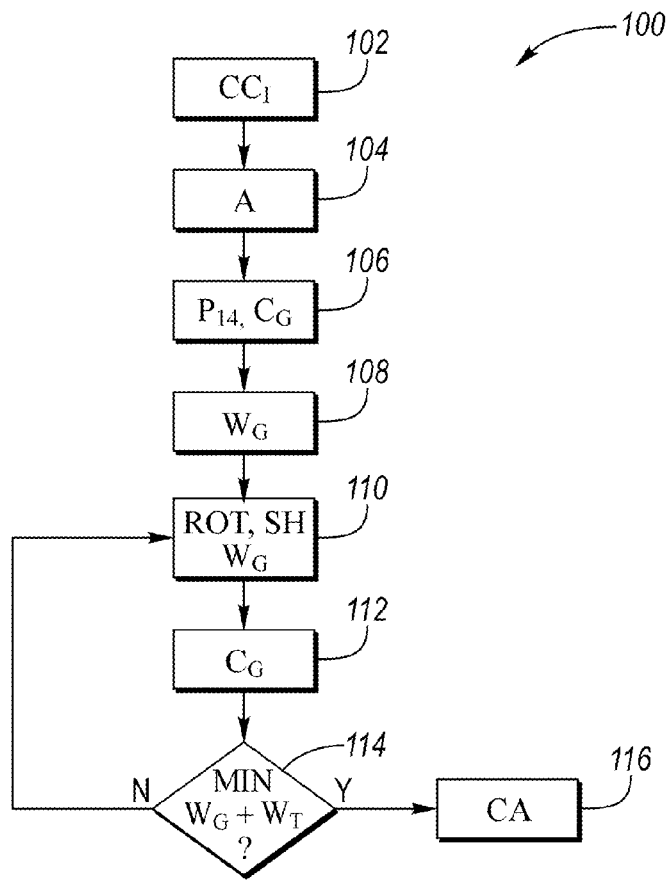
FIG. 2 is a flow chart describing an example embodiment of a method of planning an optimal grasp of an object using the system shown in FIG. 1.

Referring to FIG. 2, the controller 40 of FIG. 1 executes the method 100 to provide an iterative approach to determining the optimal grasp pose, doing so by translating and/or rotating a previously calculated grasp pose as needed to best/optimally balance the task and grasp wrenches. Beginning at step 102, the controller 40 receives the set of inputs ($CC_I$), which as noted above with reference to FIG. 1 may include the shape and location of the object 12, the task wrench ($w_T$), and the commanded grasp force applied to the object 12 by the end-effector 14, i.e., the end-effector grasp force. The controller 40 then proceeds to step 104.

At step 104, the controller 40 next selects an initial approach vector, represented as arrow A, for the end-effector 14 to the object 12 as if there is no task requirement. That is, the controller 40 picks an arbitrary approach vector to the object 12, and thereafter proceeds to step 106.

Step 106 entails computing a grasp pose using the approach vector selected in step 104 that produces secure grasp contacts ($C_G$) of the end-effector 14 on the object 12. Step 106 may entail computing the position and orientation of the palm 17 and joint positions of each finger 15 of the example end-effector 14 that produces grasp contacts, e.g., using the known kinematics and the approach vector.

Step 106 also includes determining any relevant environmental constraints, such as any planar restrictions on the end-effector 14 and adjusting the grasp pose based on these environmental constraints. For example, the object 12 may be resting on a table, in which case the end-effector 14 cannot approach the object 12 from certain directions, and/or may not be able to fully close its fingers 15 around the object 12 using certain grasp poses such as a power grasp/full grasp involving all of the fingers 15 and the palm 17. In other words, the environmental constraints considered in step 106 include any physical or artificial boundaries restricting the range of motion of the end-effector 14.

At step 108, the controller 40 uses the current grasp pose to next compute the resultant net grasp wrench $w_G$ in the same frame of reference as the task wrench $w_T$, e.g., the same object Cartesian frame. To illustrate the principles of step 108, FIG. 3A shows the object 12 with example grasp forces $\vec{F}_i$ and $\vec{F}_{i+1}$ and example grasp torques $\vec{\tau}_i$ and $\vec{\tau}_{i+1}$ at grasp contacts i and i+1. All grasp forces and torques at all grasp contacts are then added via the controller 40 to produce the net grasp wrench $w_G$ as follows:

$$\vec{F}_{NG} = \sum_{i=1}^{n} \vec{F}_i, \vec{\tau}_{NG} = \sum_{i=1}^{n} \vec{p}_i \times \vec{F}_i.$$

The summated forces and torques are shown schematically in FIG. 3B.

The controller 40 may use orthogonal decomposition principles to conduct step 110. As is known in the art, torque may be decomposed into perpendicular and parallel components as follows:

$$\vec{\tau}_{NG} = \vec{\tau}_{\perp FNG} + \vec{\tau}_{\parallel \vec{F}_{NC}}$$

Figure 5:
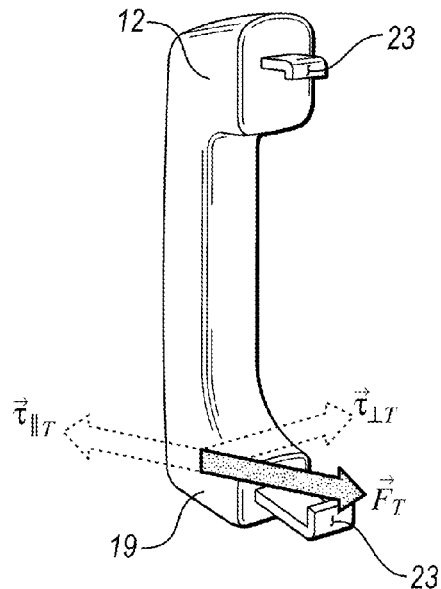
FIG. 5 shows orthogonal decomposition of the task force and torque wrenches.

Such decomposition is depicted in FIG. 4. Similarly, the known or given task torque can be decomposed orthogonally as well $\vec{\tau}_{\perp T}$ and $\vec{\tau}_{\parallel T}$ as shown in FIG. 5.

Referring again to FIG. 2, once the controller 40 of FIG. 1 has calculated the resultant net grasp wrench, the method 100 proceeds to step 110, wherein the controller 40 next rotates (ROT) and shifts (SH) the grasp pose computed at step 108 so as to better balance the task wrench $w_T$ with the grasp wrench $w_G$. This step will now be described with reference to FIGS. 6A and 6B.

The controller 40 of FIG. 1 automatically rotates the grasp force so that the grasp force aligns with the task force, and such that the value $(R\vec{F}_{NG} + \vec{F}_T)$ is minimized when $\vec{F}_{NG} \neq 0$ and $\vec{F}_T \neq 0$. In this expression, R is a three-angle rotation matrix with normal (n), orientation (o), and approach (a) components:

$$R = \begin{bmatrix} n_x & o_x & a_x \\ n_y & o_y & a_y \\ n_z & o_z & a_z \end{bmatrix}$$

Figure 6A:
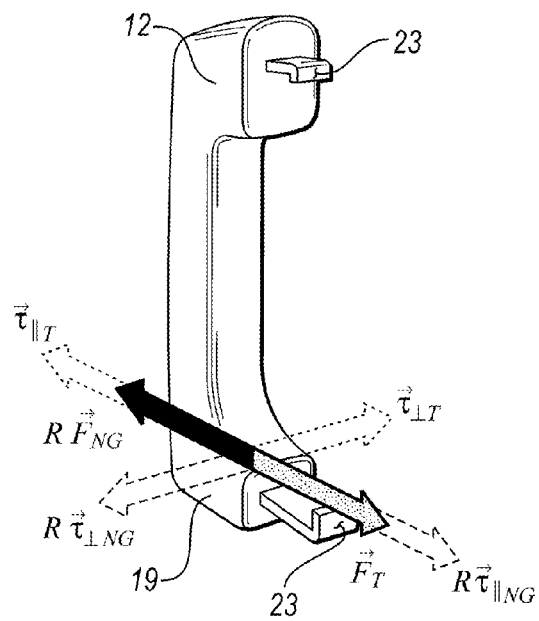
FIGS. 6A and 6B show the respective rotated and shifted net grasp force and torque that are aligned with the task force and torque as part of the present method.

FIG. 6A shows the rotation of the net grasp wrench by the matrix R. Step 110 also includes shifting, by $\vec{\delta}$, so that the grasp torque is optimally balanced, i.e.,:

$$\min(R\vec{F}_{NG} \times \vec{\delta} + R\vec{\tau}_{\perp NG} + \vec{\tau}_{\perp T})$$

Figure 6B:
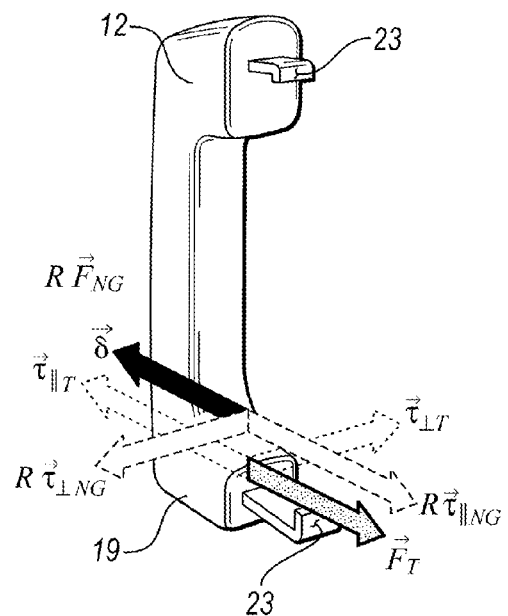

FIG. 6B shows the rotation and shifting or translation of the net grasp wrench by the matrix R and the translation $\vec{\delta}$, respectively.

Referring again to FIG. 2, at step 112 the controller 40 applies the computed ROT and SH in Step 110 to the previous palm orientation and position of the end-effector 14. With this newly updated palm orientation and position, the finger joint positions are re-computed for the new grasp contacts ($C_G$), with environmental constraints as explained above with reference to step 106. The updated grasp wrench is then re-computed based on the new grasp contacts. Step 112 is necessary, as the grasp pose has changed in step 110 due to the applied rotational and shift. The method 100 then proceeds to step 114.

At step 114, the controller 40 determines whether the task and new updated grasp wrenches have been optimally balanced, i.e., whether $w_G + w_T$ is minimized, a state that can be determined by minimizing the values shown in FIGS. 6A and 6B. If not, step 110 is repeated until the minimum value of $w_G + w_T$ is achieved, with iterations of steps 110 and 112 repeated until such optimal balance is achieved. The method 100 proceeds to step 116 when optimal balance is achieved.

Step 116 includes recording the optimal grasp pose in memory, and thereafter executing a control action (CA) with respect to the robot 20 of FIG. 1 using the recorded optimal grasp pose. At step 116, that is, the optimal grasp type is known for the task at hand. If the task changes, the controller 40 automatically updates the grasp type via another iteration of the method 100, i.e., without manual teaching or training of the robot 20.

While the best modes for carrying out the invention have been described in detail, those familiar with the art to which this invention relates will recognize various alternative designs and embodiments for practicing the invention within the scope of the appended claims.

The invention claimed is:

1. A method of determining an optimal grasp pose of an object by an end-effector of a robot in the execution of a task, the method comprising:
   receiving a set of inputs via a controller, including a descriptive parameter of the object, a task wrench having a frame of reference, and a commanded end-effector grasp force;
   calculating a grasp wrench in the frame of reference of the task wrench;
   rotating and shifting the grasp wrench via the controller until the task wrench and the grasp wrench are optimally balanced, wherein the task wrench and the grasp wrench are optimally balanced when the sum of the task wrench and the grasp wrench is minimized;
   recording the optimal grasp pose in memory of the controller as the grasp pose at which the grasp wrench and the task wrench are optimally balanced; and
   executing a control action via the controller using the recorded optimal grasp pose.

2. The method of claim 1, further comprising:
   selecting an initial approach vector for the end-effector to the object as an arbitrary approach vector;
   grasping the object via the end-effector using an arbitrary grasp pose; and
   computing a position and a set of grasp contacts of the end-effector in the arbitrary grasp pose, and a resultant grasp wrench of the arbitrary grasp pose.

3. The method of claim 2, wherein the end-effector includes a palm and multiple fingers, and wherein computing the position and the set of grasp contacts includes computing a position and orientation of the palm, and the grasp contacts of each of the fingers, using known kinematics of the end-effector and known dimensions and position of the object.

4. The method of claim 1, wherein rotating and shifting the grasp wrench includes using orthogonal decomposed torque components.

5. The method of claim 1, wherein rotating and shifting the grasp wrench includes using orthogonal decomposition such that the torque is decomposed into perpendicular and parallel components.

6. The method of claim 1, wherein the descriptive parameter of the object includes a shape of the object and a location of the object in free space.

7. A robotic system comprising:
   a robot having an end-effector; and
   a controller having a processor and tangible, non-transitory memory on which is recorded instructions for determining an optimal grasp pose of an object by the end-effector in the execution of a task;
   wherein execution of the instructions by the processor causes the controller to:
   receive a set of inputs via a controller, including a descriptive parameter of the object, a task wrench having a frame of reference, and a commanded end-effector force;
   calculate a grasp wrench in the frame of reference of the task wrench;
   rotate and shift the grasp wrench via the controller until the task wrench and the grasp wrench are optimally balanced, wherein the task wrench and the grasp wrench are optimally balanced when the sum of the task wrench and the grasp wrench is minimized;
   record the optimal grasp pose in the memory as the grasp pose at which the grasp wrench and the task wrench are optimally balanced; and
   execute a control action using the recorded optimal grasp pose.

8. The robotic system of claim 7, wherein the end-effector is a gripper or robotic hand.

9. The robotic system of claim 8, wherein the gripper or robotic hand includes a palm and multiple fingers, and wherein computing the position and the set of grasp contacts includes computing a position and orientation of the palm, and the grasp contacts of each of the fingers, using known kinematics of the end-effector and known dimensions and position of the object.

10. The robotic system of claim 7, wherein the controller is programmed for selecting an initial approach vector for the end-effector to the object as an arbitrary approach trajectory, grasping the object via the end-effector using an arbitrary grasp pose, and computing a position and a set of grasp contacts of the end-effector in the arbitrary grasp pose.

11. The robotic system of claim 7, wherein the controller rotates and shifts the grasp wrench by using orthogonal decomposed torque components.

12. The robotic system of claim 7, wherein the controller rotates and shifts the grasp wrench using orthogonal decomposition such that the controller decomposes the torque into perpendicular and parallel components.

13. The robotic system of claim 7, wherein the descriptive parameter of the object includes a shape of the object and a location of the object in free space.

* * * * *